UNITED STATES PATENT OFFICE.

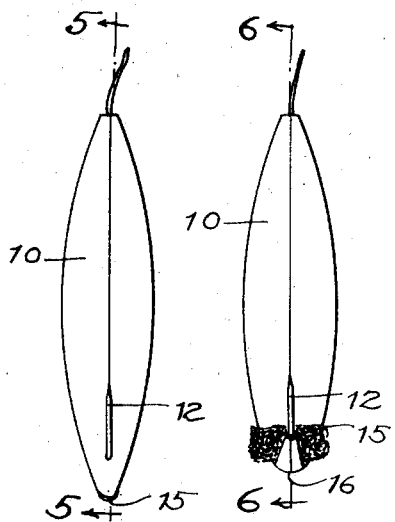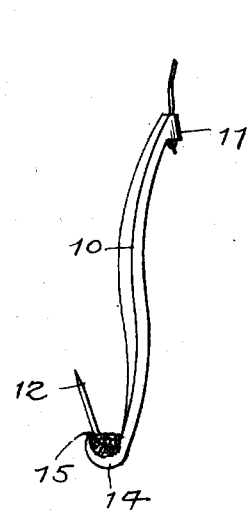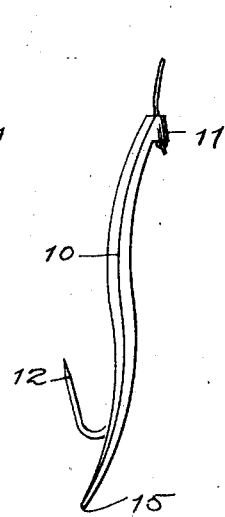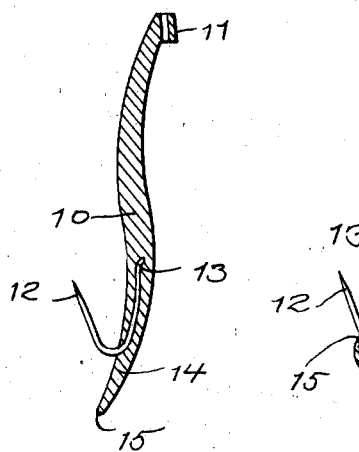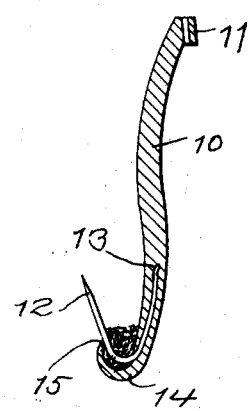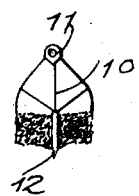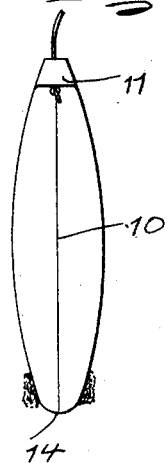

FRED DAHLGREN, OF STRANDBURG, SOUTH DAKOTA.

FISHHOOK.

1,390,767.   Specification of Letters Patent.   Patented Sept. 13, 1921.

Application filed February 23, 1921. Serial No. 447,126.

*To all whom it may concern:*

Be it known that I, FRED DAHLGREN, a citizen of the United States, residing at Strandburg, in the county of Grant and State of South Dakota, have invented certain new and useful Improvements in Fishhooks, of which the following is a specification, reference being had to the accompanying drawings.

This invention relates to improvements in fish hooks, and more particularly to a fish hook adapted for use in fishing through the ice.

An important object of the invention is to provide a combined sinker and fish hook.

A further object of the invention is to provide a hook comprising a body portion forming a sinker and having an extremity adapted to combine with the hook to form a bait-receiving loop adapted for the reception of any type of bait which may be employed.

Other objects and advantages of the invention will become apparent throughout the course of the following description.

In the accompanying drawings, wherein for the purpose of illustration is shown a preferred embodiment of my invention and wherein like reference characters designate like parts throughout, Figure 1 is a side elevation of one form of my hook;

Fig. 2 is a side elevation of the second form thereof;

Fig. 3 is an edge elevation of the form shown in Fig. 2;

Fig. 4 is an edge elevation of the form shown in Fig. 1;

Figs. 5 and 6 are sectional views taken on the lines 5—5 and 6—6 of Figs. 1 and 2 respectively;

Fig. 7 is a top plan view of the hook; and

Fig. 8 is a rear elevation thereof.

Referring now more particularly to the drawings, the numeral 10 indicates a body portion formed of some pliable non-resilient material such as lead or white metal, and provided at its upper end with means whereby a line may be attached thereto, as indicated at 11. This means preferably takes the form of an integral extension having an opening formed therethrough through which the line may be passed and secured to the body portion by a blow deforming the extension and causing the same to engage against the line. The body proper is made of sufficient size to effectually resist deformation in use.

The numeral 12 designates a hook positioned at the lower end of the body portion and embodying a shank 13 embedded in the body portion, the hook being applied in the body portion while casting the same. The body portion at its lower end is provided with an integral reduced extension 14, the end 15 of which may be bent to engage the hook 12 and more particulary the under surface thereof at a point spaced from the body portion proper, thereby combining with the hook to form a bait-receiving loop.

The hooks may be either distributed to the trade with the extension 14 in the position shown in Fig. 1, so that the purchaser may apply any artificial bait which he may desire and secure the extension thereabout by deforming the same until the extremity 15 engages the hook, or the hooks may be distributed in the form shown in Fig. 2, having an artificial bait 16 applied and the extension 14 bent to the proper position. The body portion of the hook is preferably highly polished in order that it may be made as attractive as possible. The hook 12 is preferably barbless, since the fish most caught through the ice, perch and pickerel, will remain upon a barbless hook as the line is drawn in and may most easily be removed from a hook of this type.

From the foregoing it is believed to be obvious that I have constructed a hook which is particularly well adapted for the use for which it is intended by reason of the fact that it combines the functions of a sinker and hook, and by reason of the fact that a bait may be applied thereto with a minimum expenditure of labor, and it will furthermore be obvious that the construction of the same as herein disclosed in capable of some change without materially departing from the spirit of my invention. I accordingly do not limit myself to the specific structure hereinabove set forth except as hereinafter claimed.

What I claim is:

1. A fish hook comprising a body portion adapted at one end for engagement with a line, a hook member arranged adjacent the opposite end of the body portion and embodying a shank embedded in the body portion, said body portion being formed of relatively heavy material and comprising a sinker, said body portion being provided at the last named end thereof with an extension, said extension being formed of pliable non-resilient material whereby said extension may be deformed to engage the end thereof with the hook at a point spaced from said body portion.

2. A fish hook comprising a body portion adapted at one end for engagement with a line, a hook member secured to said body portion adjacent the opposite end thereof, and an extension formed on the last named end of the body portion having its end engaged with the hook at a point spaced from the body portion and combining with said hook portion to form a bait-receiving loop.

In testimony whereof I hereunto affix my signature.

FRED DAHLGREN.